United States Patent [19]

Yaguchi et al.

[11] Patent Number: 5,337,332
[45] Date of Patent: Aug. 9, 1994

[54] TRAINING DETECTION APPARATUS

[75] Inventors: Tatsuya Yaguchi; Koichi Tanaka, both of Yokohama, Japan

[73] Assignee: Canon Kabushiki Kaisha, Tokyo, Japan

[21] Appl. No.: 886,832

[22] Filed: May 22, 1992

[30] Foreign Application Priority Data

May 27, 1991 [JP] Japan .................................. 3-120773

[51] Int. Cl.$^5$ .................... H03D 1/00; H04L 27/06; H04L 7/00
[52] U.S. Cl. ........................................ 375/94; 375/115
[58] Field of Search ................... 375/8, 13, 113, 116, 375/94, 115, 76; 379/93, 98

[56] References Cited

U.S. PATENT DOCUMENTS 4,788,692 11/1988 Takebayashi et al. ................ 375/8
5,202,905 4/1993 Sakamoto et al. ................... 375/8

Primary Examiner—Stephen Chin
Assistant Examiner—Duane Kobayashi
Attorney, Agent, or Firm—Fitzpatrick, Cella, Harper & Scinto

[57] ABSTRACT

A received alternate pattern segment is demodulated by a DEM (13), and a power of a demodulated baseband signal is calculated by a power calculator (15). The calculated power is multiplied with a predetermined constant α by a constant multiplier (16). A power of a signal obtained by removing a frequency component ($\frac{1}{2}$) the baud rate frequency from the baseband signal output from a BEF (14) is calculated by a power calculator (15'). An adder/subtracter (17) compares the powers by subtracting the two signals, and the sign of the comparison result is discriminated by a sign discriminator (19), thereby detecting an alternate pattern segment and the start point of a pseudo pattern sequence. Furthermore, a count value of a counter (110) is monitored, and when a detection state of an alternate pattern segment continues for a predetermined period of time, it is determined that an alternate pattern segment is detected in practice. In the above arrangement, an alternate pattern signal can be reliably and precisely detected without causing an erroneous detection even when the level of a reception signal abruptly changes. Alternatively, a pseudo random sequence can be reliably and precisely detected without causing an erroneous detection even for a reception signal having a low S/N ratio.

44 Claims, 9 Drawing Sheets

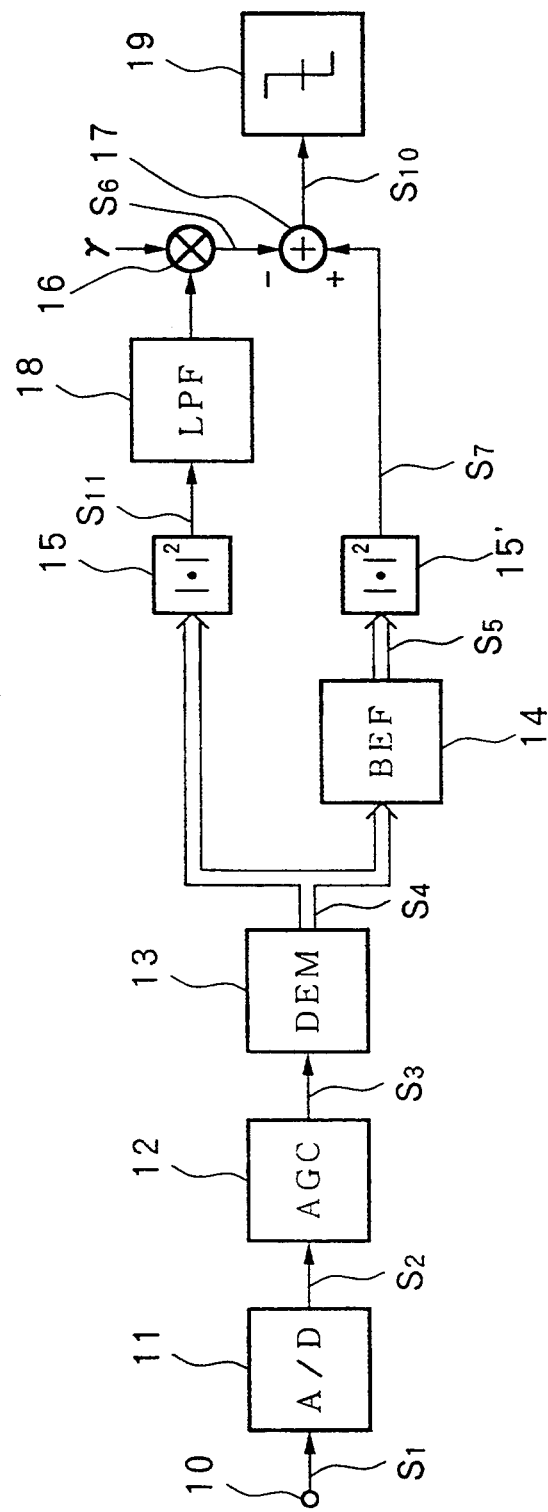
F I G. 4

TRAINING DETECTION APPARATUS

BACKGROUND OF THE INVENTION

1. Field of the Invention

The present invention relates to a training detection apparatus for detecting a training sequence sent from a transmission-side modem, for example, to a training detection apparatus capable of detecting training signals based on Segment 3/1 of the CCITT recommendation V.27ter/bis and Segment 2/1 of V.29/V.33, or Segment 4/2 of the CCITT recommendation V.27ter/bis and Segment 3/2 of V.29/V.33.

2. Prior Art

In a CCITT recommendation V.27ter or V.29 type modem, after transmission- and reception-side modems are connected through a communication line, the transmission-side modem outputs a predetermined training signal sequence (turn-ON sequence) so as to initialize signal processors of the reception-side modem.

For example, the training signal sequence has a format shown in Table 1 in a CCITT recommendation V.27ter type modem.

In a CCITT recommendation V.29 type modem, the training signal sequence has a format shown in Table 2.

In the CCITT recommendation V.27ter type modem shown in Table 1, the format of Segment 3 corresponds to a continuous 180° phase inverted pattern on a line during a) a 14-symbol interval or b) a 50-symbol interval.

Segment 4 corresponds to an equalizer adjustment pattern, and is formed by the third bits obtained by dividing a pseudo random sequence generated by the following polynomial by 3 bits.

$$1+X^{-6}+X^{-7}$$

In the CCITT recommendation V.29 type modem shown in Table 2, Segment 1 corresponds to a preparation period for Segment 2 and the subsequent segments.

Segment 2 is an element, used in AGC adjustment, reception carrier timing extraction/synchronization, and the like, for alternately transmitting two signal elements. More specifically, a signal element (A) transmitted first has a relative amplitude value "3" and an absolute phase of 180°. An element (B) transmitted secondly depends on the data speed. Signal elements in data signals will be described in detail later.

Segment 3 is an element for initializing an equalizer, and transmits two signal elements according to an equalizer adjustment pattern. A first signal element (C) has a relative amplitude value "3" and an absolute phase of 0°. A second signal element (D) depends on the data speed. The equalizer adjustment pattern is generated according to a pseudo random sequence generated by the following polynomial.

$$1+X^{-6}+X^{-7}$$

Segment 4 is an element for attaining synchronization of a scrambler and a descrambler, and is generated according to a pseudo random sequence generated by the following polynomial.

$$1+X^{-18}+X^{-23}$$

The reception-side modem receives the training signal sequence, and initializes an AGC, an automatic equalizer, and the like as main constituting blocks of a receiving section.

In Tables 1 and 2, Segment 4 of the V.27ter type modem and Segment 3 of the V.29 type modem are segments for adjusting tap coefficients in an initialization stage so as to realize inverse characteristics of a communication line. The initialization of the reception-side modem is started from the beginning of Segment 3 of the V.27ter type modem and Segment 2 of the V.29 type modem, which are received earlier than the equalizer adjustment segments.

FIG. 6A shows the format of a demodulated baseband signal in Segment 3 at an 8-phase phase modulation rate of 4,800 bps (1,600 baud) of the V.27ter modem.

Continuous 180° phase inverted signals indicated by black dots . are received. FIG. 6B shows frequency components of the demodulated baseband signal in this segment.

As shown in FIG. 6B, the demodulated baseband signal at this time has a frequency $\frac{1}{2}$ a baud rate $f_b$.

More specifically, the demodulated baseband signal has line spectrums at $\pm f_b/2 = \pm 1,600/2 = \pm 800$ Hz.

FIG. 7A shows the format of a demodulated baseband signal in Segment 2 at a 16-value orthogonal amplitude modulation rate of 9,600 bps (2,400 baud) of the V.29 modem.

In FIG. 7A, points surrounded by ◯ indicated by (A), (B), (C), and (D) correspond to the above-mentioned signal elements A to D in Segments 2 and 3.

More specifically, in Segment 2, an alternate pattern of points A and B is received.

FIG. 7B shows frequency components of the demodulated baseband signal at this time. As shown in FIG. 7B, the demodulated baseband signal in Segment 2 has line spectrums at $\pm f_b/2 = \pm 1,200$ Hz as $\frac{1}{2}$ the baud rate frequency and a DC frequency.

The pseudo random sequence in Segment 3 is generated using PN codes according to the above-mentioned polynomial. In the case of the V.29 modem, when the pseudo random sequence is "0", a point C is always transmitted; when the pseudo random sequence is "1", a point D is always transmitted. More specifically, Segment 3 starts with CDCDCDC . . . of the sequence, and continues during a 384-symbol interval.

In order to pull an automatic equalizer, the transmission-side modem transmits a pseudo random sequence signal, and the reception-side modem also generates the same signal. The automatic equalizer is initialized based on a difference signal between the pseudo random sequence signal input from the transmission-side modem to the reception-side modem and the signal generated by the reception-side modem.

In order to perform the above-mentioned operations, an alternate pattern signal must be reliably detected from input signals, and the start point of the random sequence signal must also be reliably detected.

The arrangement of a conventional training signal detection apparatus (pseudo random sequence signal detection apparatus) for a modem will be described below with reference to FIG. 8. FIG. 8 is a block diagram of a conventional training signal detection apparatus (pseudo random sequence signal detection apparatus) for a modem.

An analog reception signal $S_1$ input to an analog input terminal 10 is converted into a digital signal $S_2$ by an A/D converter 11, and the digital signal is supplied to an automatic gain controller (AGC) 12.

The circuit after the A/D converter 11 is often realized by a software program in a digital signal processor (DSP) in practice.

The AGC 12 converts the digital signal $S_2$ into a signal $S_3$ normalized to a proper power. A demodulator (DEM) 13 demodulates the signal $S_3$ normalized to the proper power into a complex baseband signal $S_4$. The demodulated complex baseband signal $S_4$ is branched into two paths. One complex baseband signal $S_4$ is filtered to a signal $S_5$ by a filter 50.

The conventional apparatus uses, as the filter 50, a narrow-band filter ($f_b/2$−BPF) having a frequency ½ the baud rate frequency $f_b$ as the central frequency of the passband. A power calculator 15' calculates a square of the absolute value of the signal $S_5$ to obtain a signal $S_7$.

The other demodulated complex baseband signal $S_4$ is supplied to a power calculator 15. The calculator 15 calculates a square of the absolute value of the signal $S_4$, and the signal $S_4$ is multiplied with a positive constant $\beta$ by a constant multiplier 16 to obtain a signal $S_6$. The two signals $S_6$ and $S_7$ are input to an adder/subtracter 17.

The adder/subtracter 17 calculates (signal $S_8$)=(signal $S_7$)−(signal $S_6$), and the signal $S_8$ is smoothed by a low-pass filter (LPF) 18 to obtain a signal $S_9$.

Since the power of the signal $S_3$ is normalized by the AGC, the power of the demodulated signal $S_4$ is normally constant independently of the signal segment. Therefore, the magnitude of the signal $S_5$ is almost constant independently of the signal segment.

The signal $S_7$ has a power of a frequency component ½ the baud rate frequency of the demodulated signal $S_4$. Therefore, in the segment of an alternate pattern signal, the signal $S_7$ assumes a considerably large value as compared to other segments.

Therefore, when $\beta$ is properly selected, the signal $S_8$ assumes a positive value in the segment of the alternate pattern signal, and assumes a negative value in other segments.

Therefore, the alternate pattern signal can be detected by checking the sign of the signal $S_9$ obtained by smoothing the signal $S_8$ by a sign discriminator 19.

Note that the LPF 18 is arranged to eliminate the influence of inversion of the sign of the signal $S_8$ due to, e.g., impulse noise.

In order to detect a subsequently sent pseudo random sequence, substantially the same arrangement as described above is used, except that the filter 50 comprises a band elimination filter (BEF) in place of the above-mentioned narrow-band filter. When this BEF is a filter having factors $(1+Z^{-2})(1-Z^{-1})$ as a transfer function, and is operated at a sampling frequency $2f_b$, it can remove a frequency component ½ the baud rate frequency and a DC component. FIG. 9 shows frequency characteristics when the transfer function of the BEF is given by $(1+Z^{-4})=(1+Z^{-2})(1-Z^{-1})(1+Z^{-1})$.

In the above-mentioned alternate pattern segment, the demodulated complex baseband signal $S_4$ has line spectrums at the frequency ½ the baud rate frequency and a DC frequency. For this reason, when the filter 50 comprises the BEF, the output signal $S_5$ becomes 0. However, when the alternate pattern segment transits to the pseudo random sequence segment, the signal $S_5$ has a large value, as is well known. Therefore, in this case, the signal $S_7$ also has a large value.

The power of the signal $S_3$ is normalized by the AGC, and the magnitude of the signal $S_6$ becomes almost constant independently of the signal segment, as described above. For this reason, when $\beta$ is properly selected, the sign of the output (signal $S_8$)=(signal $S_7$)−(signal $S_6$) from the adder/subtracter 17 can be reliably changed from a negative value to a positive value at the beginning of a pseudo random sequence segment.

Therefore, when the sign of the signal $S_9$ obtained by smoothing the signal $S_8$ by the LPF 18 is checked by the sign discriminator 19, the start point of a pseudo random sequence segment can be detected.

However, in the above-mentioned arrangement, the narrow-band filter operation of the filter 50 in the alternate pattern segment detection processing delays transmission of a signal power. For this reason, the signal $S_7$ follows a change in power of the demodulated signal $S_4$ with a delay. For this reason, when the power of the signal $S_4$ abruptly changes due to some cause, the sign of the signal $S_9$ may be inverted.

For example, a case will be examined below wherein instantaneous disconnection occurs during data reception. When data is normally received, the sign of the signal $S_9$ is negative. At this time, when a instantaneous disconnection occurs, the power of the signal $S_3$ assumes a value very close to 0 since the AGC 12 cannot immediately increase the gain. During this interval, the signals $S_4$ and $S_6$ also assume values very close to 0.

However, since the signal $S_7$ follows a change in power of the signal $S_4$ with a delay, a situation of $S_7 > S_6 \approx 0$ occurs. At this time, the signal $S_9$, which must be originally negative, becomes positive, and an alternate pattern signal is erroneously detected.

Thus, although data is being received, a controller of the modem forcibly initializes the various signal processors of the modem to a state before the beginning of training.

At this time, possibility that an equalizer adjustment signal is erroneously detected is also very high. The controller of the modem starts training of the automatic equalizer. However, in practice, since no equalizer adjustment signal is received, the equalizer is not trained but diverges.

In this manner, in a conventional alternate pattern segment detection method, when a signal power abruptly changes during data reception, an alternate pattern signal may be erroneously detected, and thereafter, the signal processors of the modem cannot be normally operated.

In control for detecting the start point of the pseudo random sequence segment, when a signal having a very low S/N ratio is received and demodulated, the signal $S_6$ varies drastically, and an erroneous detection consequently occurs. In this case, the erroneous detection can be prevented by increasing the time constant of the LPF 18. However, when the time constant of the LPF 18 is sufficiently increased, the sign of the signal $S_9$ cannot be inverted to a positive value even when the signal $S_7$ becomes large.

For this reason, when the time constant of the LPF 18 is increased too much, the start point of a pseudo random sequence cannot be detected.

As a result, the time constant of the LPF 18 cannot be increased too much, and an erroneous detection for a signal having a low S/N ratio cannot be effectively prevented.

When the start point of a pseudo random sequence cannot be normally detected, the automatic equalizer cannot be initialized.

When the equalization processing cannot be normally performed, received data completely loses its reliability, thus posing a very serious problem.

SUMMARY OF THE INVENTION

The present invention has been made to solve the above-mentioned problems, and has as its object to provide a training detection apparatus for a modem, which can reliably and precisely detect an alternate pattern signal without causing an erroneous detection even when the level of a reception signal abruptly changes.

It is another object of the present invention to provide a training detection apparatus, which can reliably and precisely detect the start point of a pseudo random sequence without causing an erroneous detection even for a reception signal having a low S/N ratio.

The present invention comprises the following arrangement as a means for achieving the above objects.

More specifically, a training detection apparatus for detecting an alternate pattern segment of a training sequence output from a transmission-side modem, comprises first calculation means for calculating a power of a demodulated baseband signal in a received alternate pattern segment, second calculation means for calculating a power of a signal obtained by removing a frequency component ($\frac{1}{2}$) a baud rate frequency from the baseband signal, comparison means for comparing the powers of the signals calculated by the second and first calculation means, and detection means for, when a detection state of the alternate pattern continues for a predetermined period, determining on the basis of the comparison result from the comparison means that the alternate pattern segment is detected.

Alternatively, a training detection apparatus for detecting a start point of a pseudo random sequence of a training sequence output from a transmission-side modem, comprises first calculation means for calculating a smoothed power of a received demodulated baseband signal, second calculation means for calculating a power of a signal obtained by removing a frequency component ($\frac{1}{2}$) a baud rate frequency and a DC component from the baseband signal, comparison means for comparing the powers of the signals calculated by the second and first calculation means, and detection means for detecting the start point of the pseudo random sequence on the basis of the comparison result from the comparison means.

In the above arrangement, an alternate pattern signal can be reliably and precisely detected without causing an erroneous detection even when the level of a reception signal abruptly changes.

Alternatively, the start point of a pseudo random sequence can be reliably and precisely detected without causing an erroneous detection even for a reception signal having a low S/N ratio.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram showing the third embodiment according to the present invention;

DETAILED DESCRIPTION OF THE PREFERRED EMBODIMENTS

The preferred embodiments of the present invention will be described in detail hereinafter with reference to the accompanying drawings.

First Embodiment

The first embodiment of the present invention, which can precisely detect the above-mentioned alternate pattern signal, will be described below.

Figure 1:
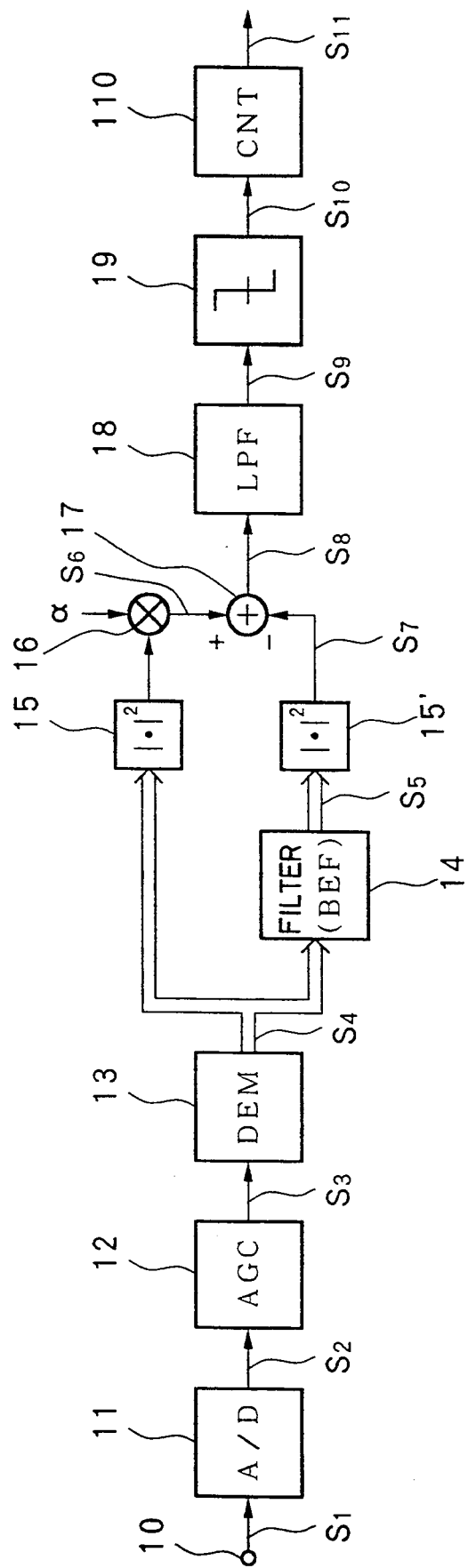
FIG. 1 is a block diagram showing the first embodiment according to the present invention.

FIG. 1 is a block diagram showing the arrangement of the first embodiment of the present invention. The same reference numerals in FIG. 1 denote the same parts as in FIG. 8 described above, and a detailed description thereof will be omitted.

In FIG. 1, a filter 14 comprises a band elimination filter (BEF) having a zero point near a frequency $\frac{1}{2}$ the baud rate frequency in place of a narrow-band filter unlike in the conventional apparatus. For this reason, the effect inherent to this embodiment can be obtained, as will be described later. Reference numerals 15 and 15' denote power calculators each for calculating a square of the absolute value of a complex signal; and 16, a constant multiplier for multiplying an input signal with a positive constant $\alpha$. Reference numeral 110 denotes a counter inherent to this embodiment.

In this embodiment, a circuit after an AGC 12 is constituted by a digital signal processor.

In the first embodiment shown in FIG. 1, a demodulated complex baseband signal $S_4$ is branched into two paths. One complex baseband signal is input to the power calculator 15 to calculate a square of the absolute value of the signal $S_4$. The output from the power calculator 15 is multiplied with the positive constant $\alpha$ by the constant multiplier 16 to obtain a signal $S_6$.

The other complex baseband signal $S_4$ is supplied to the BEF 14 to generate a signal $S_5$ by removing a frequency component $\frac{1}{2}$ the baud rate frequency. Furthermore, the square of the absolute value of the signal $S_5$ is calculated by the power calculator 15' to obtain a signal $S_7$.

An adder/subtracter 17 calculates (signal $S_8$) = (signal $S_6$) − (signal $S_7$).

Figure 2:
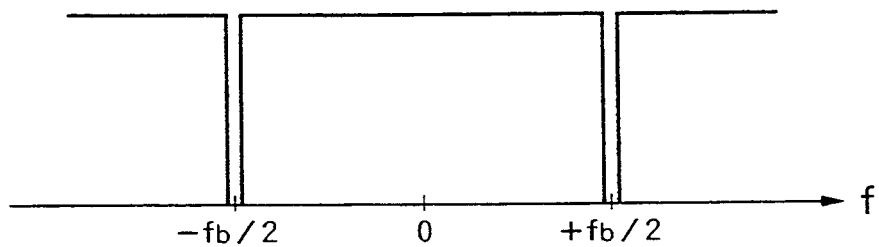
FIG. 2 is a graph showing preferable frequency characteristics of a BEF shown in FIG. 1.

The BEF 14 preferably has frequency characteristics shown in FIG. 2. In this case, the power $S_7$ of the output signal $S_5$ from the BEF 14 consists of only a DC component in an alternate pattern segment, and is almost equal to the total power of the signal $S_4$ in other segments. Thus, an alternate pattern can be detected by detecting that the ratio of the output power from the BEF 14 to the power of the demodulated signal is decreased. More specifically, the detection condition of an alternate pattern can be expressed as follows using the constant $\alpha(0<\alpha<1)$:

{(Output Power of BEF 14)/(Power of Demodulated Signal)}$<\alpha$

More specifically, the detection condition can be expressed by:

$\alpha$(Power of Demodulated Signal)−(Output Power of BEF 14)>0

Therefore, in principle, when the sign of the signal $S_8$ is positive, it can be determined that an alternate pattern signal is detected.

In the above arrangement, since the BEF 14 is used as a filter in place of the conventional narrow-band filter, there is almost no transmission delay of a signal power. Therefore, when the power of the baseband signal $S_4$ abruptly changes, the power of the signal $S_5$ varies at substantially the same timing.

Therefore, when the level of the reception signal $S_1$ abruptly changes, the gain of the AGC cannot follow this change, and the power of the demodulated signal $S_4$ largely changes, the sign of the signal $S_8$ is stable. For this reason, an alternate pattern signal will not be erroneously detected even when the level of the reception signal $S_1$ abruptly changes.

However, in this arrangement, the sign of the signal $S_8$ may be inverted to cause an erroneous detection due to Gaussian noise or impulse noise in a practical application. In order to prevent this, this embodiment further comprises the following specific circuit.

More specifically, the signal $S_8$ is smoothed by an LPF 18 to obtain a signal $S_9$, and the signal $S_9$ is supplied to a sign discriminator 19 to check the sign of the signal $S_9$.

The sign discriminator 19 of this embodiment outputs a control signal $S_{10}$ to the counter 110 so as to increment the counter 110 when the sign of the signal $S_9$ is positive, and to clear the counter 110 to 0 when the sign of the signal $S_9$ is negative. When the count value of the counter 110 exceeds a natural number N, the counter 110 outputs an alternate pattern detection signal $S_{11}$ to a modem controller (not shown).

In this manner, even when Gaussian noise or impulse noise is input, it will not be erroneously detected as an alternate pattern signal.

Second Embodiment

The first embodiment employs the detection condition of an alternate pattern signal given by:

{$\alpha$(Power of Demodulated Signal)−(Output Power of BEF 14)}>0      (1)

However, the present invention is not limited to this, and the detection condition may be variously modified as follows:

{(Power of Demodulated Signal)−$\alpha^{-1}$ (Output Power of BEF 14) }0      (2)

{(Output Power of BEF 14)−$\alpha$(Power of Demodulated Signal)}>0      (3)

{$\alpha^{-1}$(Output Power of BEF 14)−(Power of Demodulated Signal)}<0      (4)

Figure 3:
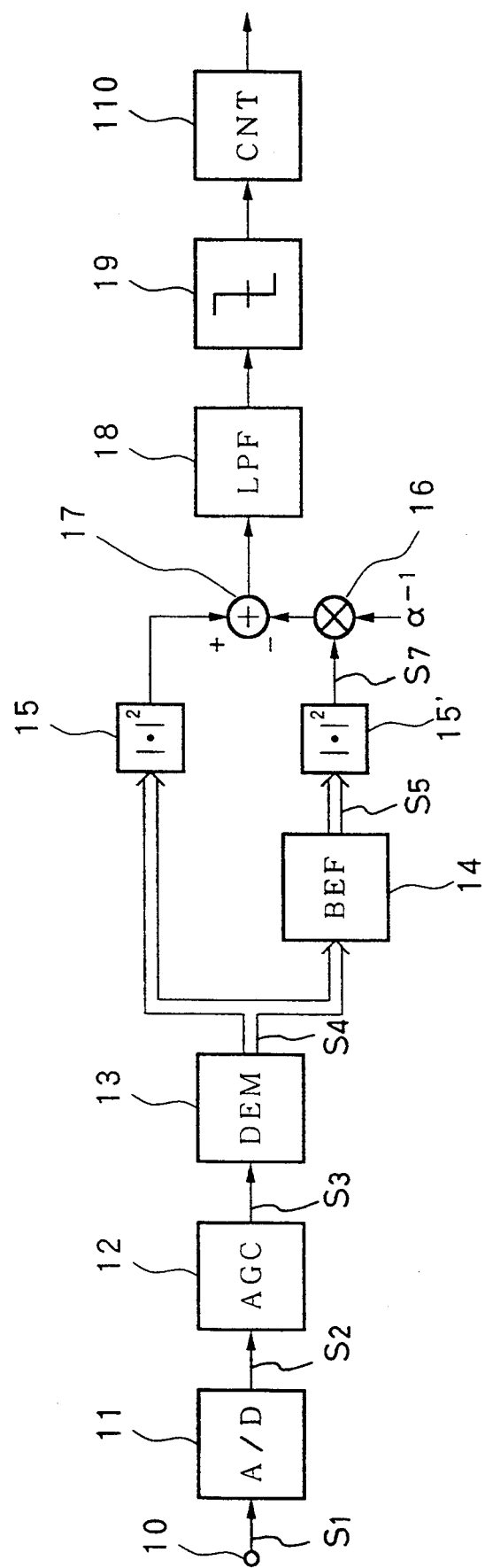
FIG. 3 is a block diagram showing the second embodiment according to the present invention.

FIG. 3 shows a detection apparatus employing condition formula (2) of these condition formulas.

In the case of condition formulas (3) and (4), the directivity of the adder/subtracter 17 is inverted, and the sign discriminator 19 increments the counter 110 when the signal $S_9$ is negative in each of FIGS. 1 and 3.

As described above, upon comparison between the power of the demodulated signal and the power of a signal obtained by removing a frequency component $\frac{1}{2}$ the baud rate frequency from the demodulated signal, an alternate pattern signal can be prevented from being erroneously detected even when a reception signal suffers from an abrupt level change.

Third Embodiment

The above description has been made for the arrangement for detecting an alternate pattern signal. The arrangement for detecting a pseudo pattern sequence will be described below.

The third embodiment of the present invention for detecting a pseudo pattern sequence will be described below with reference to FIG. 4.

Figure 8:
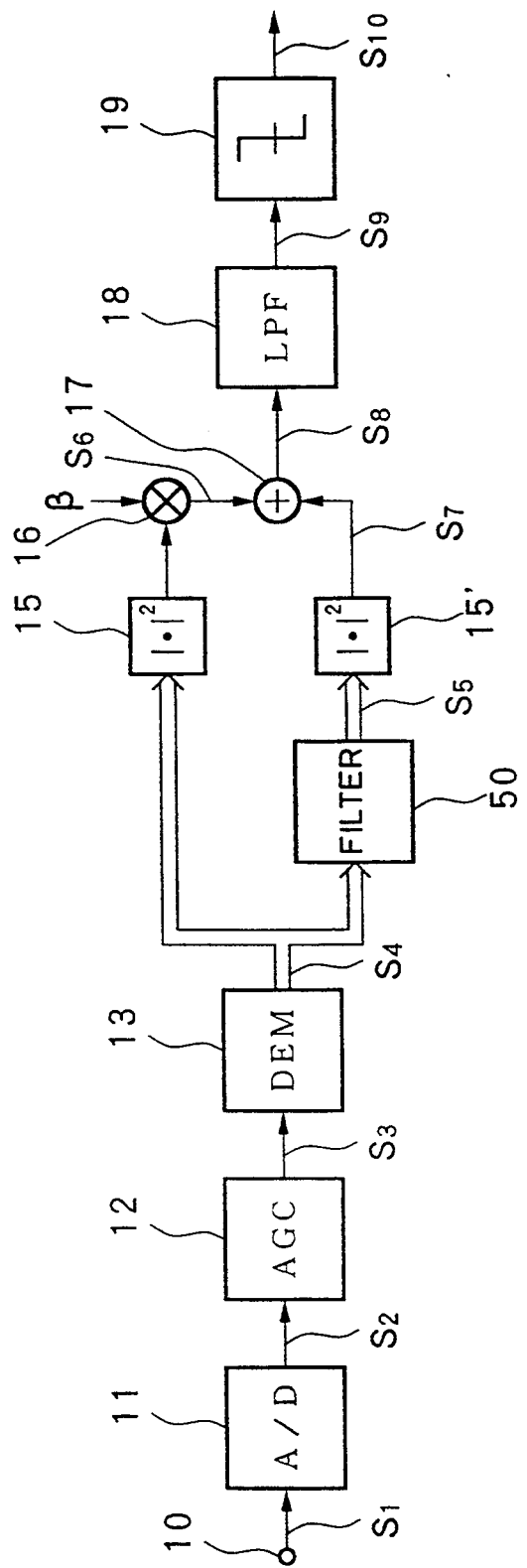
FIG. 8 is a block diagram showing the arrangement of a conventional alternate pattern signal or pseudo random sequence detection unit.
Figure 9:
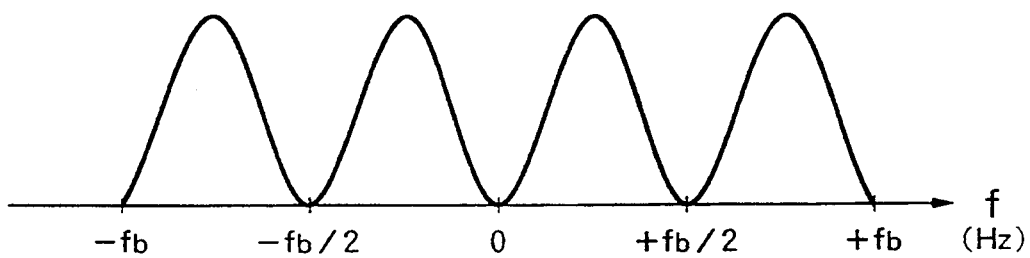
FIG. 9 is a graph showing frequency characteristics of a BEF in the pseudo random sequence detection unit.

The same reference numerals in FIG. 4 denote the same parts as in FIGS. 1 and 8, and a detailed description thereof will be omitted.

In this embodiment, the output from a power calculator 15 is directly input to and smoothed by an LPF 18 in place of a constant multiplier 16. The output from the LPF 18 is input to the constant multiplier 16, and is multiplied with $\gamma$ to obtain a signal $S_6$. The output from an adder/subtracter 17 is input to a sign discriminator 19.

The adder/subtracter 17 calculates (signal $S_{10}$)=(signal $S_7$)−(signal $S_6$).

In this case, as has been described in the prior art, the signal $S_7$ changes to a value larger than 0 at the start point of a pseudo random sequence. Since the signal $S_6$ is smoothed by the LPF 18, it has only a small change even when a signal having a low S/N ratio is received.

Therefore, a change in signal $S_7$ directly appears as a change in signal $S_{10}$ substantially without being influenced by, e.g., white noise.

Therefore, the constant $\gamma$ of the constant multiplier 16 can be determined, so that the signal $S_{10}$ changes from a negative value to a positive value at the beginning of a pseudo random sequence.

More specifically, the value $\gamma$ can be determined to satisfy {(power of signal $S_7$)−$\gamma$(output power of LPF 18)}>0 at the beginning of a pseudo random sequence. The sign discriminator 19 checks the sign of the signal $S_{10}$, and when the signal $S_{10}$ changes from a negative value to a positive value, it can be determined that the start point of a pseudo random sequence is detected.

As described above, according to this embodiment, upon comparison between the smoothed power of the demodulated signal and a signal obtained by removing a frequency component $\frac{1}{2}$ the baud rate frequency and a DC component from the demodulated signal, the start point of a pseudo random sequence can be reliably and precisely detected without causing an erroneous detection for a reception signal having a low S/N ratio.

Fourth Embodiment

In the third embodiment, when (signal $S_{10}$)=(signal $S_7$)−(signal $S_6$) is positive, the start point of a pseudo random sequence is detected.

This detection condition is given by:

ous detection even for a reception signal having a low S/N ratio.

As many apparently widely different embodiments of the present invention can be made without departing from the spirit and scope thereof, it is to be understood that the invention is not limited to the specific embodiments thereof except as defined in the appended claims.

TABLE 1

| Type of Line Signal | Segment 1 Non-modulated Carrier | Segment 2 No Transmission Energy | Segment 3 Continuous 180° Inverted Phase | Segment 4 0°–180° 2-phase Equalizer Adjustment Pattern | Segment 5 Signal Obtained by Scrambling Continuous "1"s | Total of Segments 1, 2, 3, 4, and 5 Nominal Time (Total) of Turn-ON Sequences | |
|---|---|---|---|---|---|---|---|
| | | | | | | 4,800 bps | 2,400 bps |
| Protection Against Speaker Echo | 185 ms to 200 ms | 20 ms to 25 ms | (a) 14 SI (b) 50 SI | (a) 58 SI (b) 1,074 SI | 8 SI | (a) 265 ms (b) 923 ms | (a) 281 ms (b) 1,158 ms |
| No Protection | 0 ms | 0 ms | (a) 14 SI (b) 50 SI | (a) 58 SI (b) 1,074 SI | 8 SI | (a) 50 ms (b) 708 ms | (a) 66 ms (b) 943 ms |

SI: symbol interval (the number of times of modulations)
(a) Short sequence (for converging equalizer during line connection)
(b) Long sequence (first sync signal immediately after line is set)

TABLE 2

| Type of Line Signal | Segment 1 No Transmission Energy | Segment 2 Alternate Output of A and B Signals | Segment 3 Equalizer Adjustment Pattern | Segment 4 Data "1" Scrambled by $1 + x^{-18} + x^{-23}$ | Total of Segments 1, 2, 3, and 4 Total of Sync Signals |
|---|---|---|---|---|---|
| Symbol Interval | 48 | 128 | 384 | 48 | 608 |
| Approximate Time (ms) | 20 | 53 | 160 | 20 | 253 |

$$\{(\text{Power of Signal } S_7) - \gamma(\text{Output Power of LPF 18})\} > 0 \quad (5)$$

However, the present invention is not limited to this detection condition, and the detection condition may be variously modified as follows:

$$\{\gamma^{-1}(\text{Power of Signal } S_8) - (\text{Output Power of LPF 18})\} > 0 \quad (6)$$

$$55 \; \gamma(\text{Output Power of LPF 18}) - (\text{Power of Signal } S_8)\} < 0 \quad (7)$$

$$\{(\text{Output Power of LPF 18}) - \gamma^{-1}(\text{Power of Signal } S_8)\} < 0 \quad (8)$$

Figure 5:
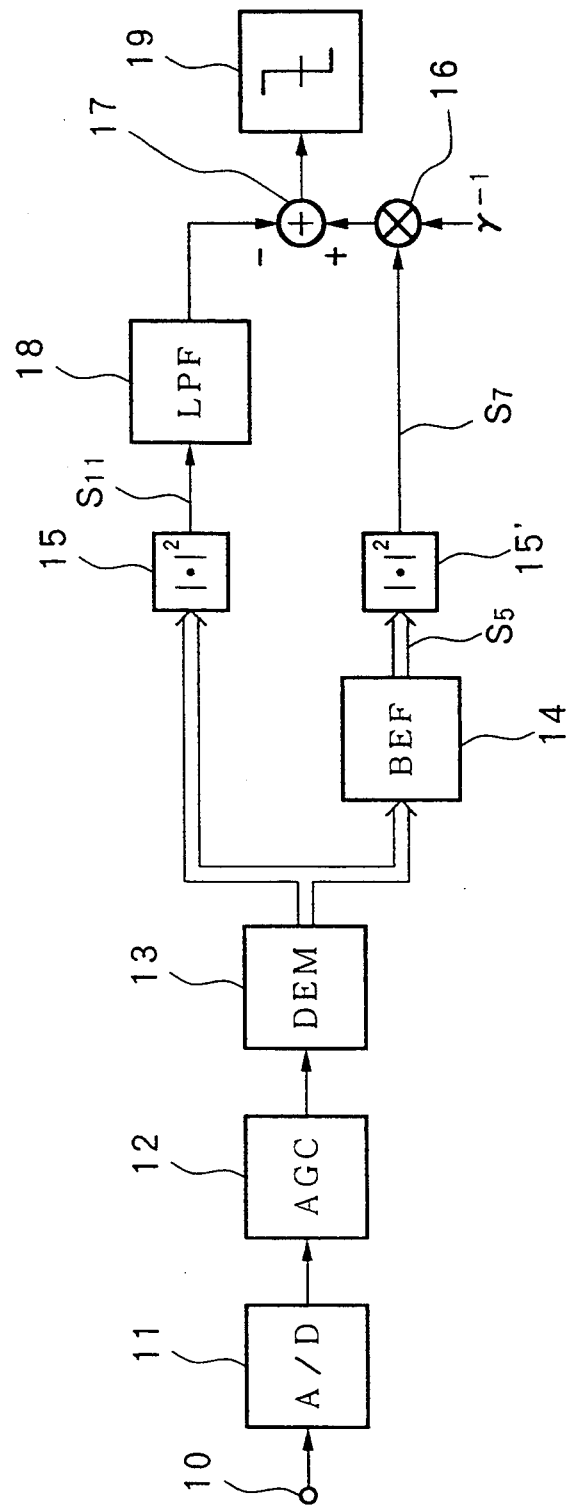
FIG. 5 is a block diagram showing the fourth embodiment according to the present invention.
Figure 6A:
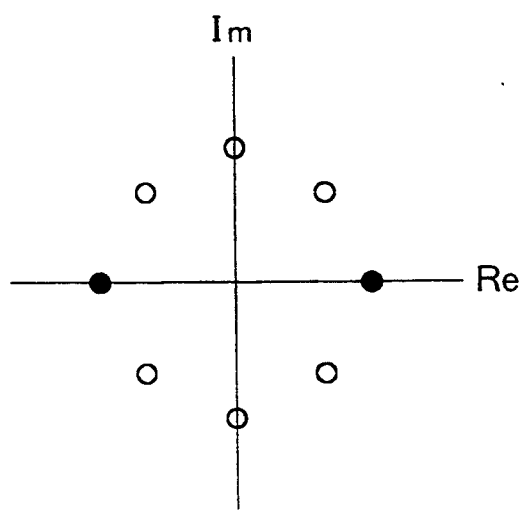
FIG. 6A is a view showing signal points in an alternate pattern signal segment in a V.27ter (4,800 bps) modem.
Figure 6B:
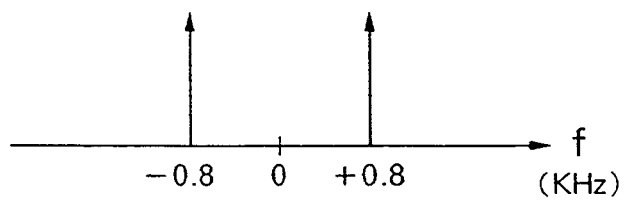
FIG. 6B is a view showing spectrums of a demodulated baseband signal in the alternate pattern signal segment in the V.27ter (4,800 bps) modem.
Figure 7A:
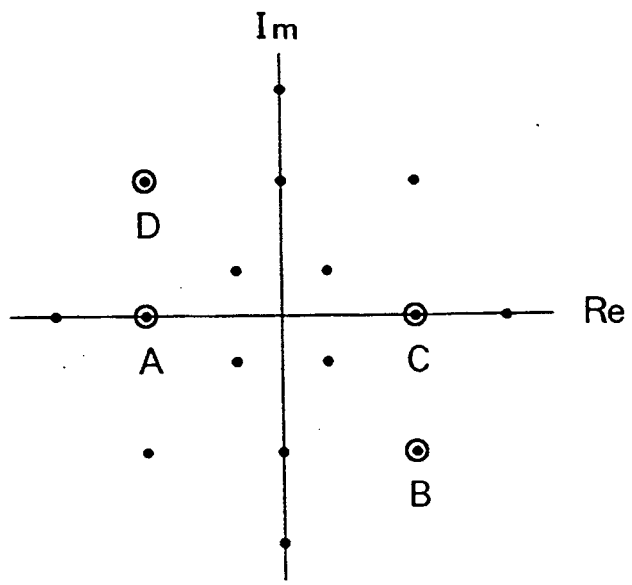
FIG. 7A is a view showing signal points in an alternate pattern signal segment and a pseudo ransom sequence in a V.29 (9,600 bps) modem.
Figure 7B:
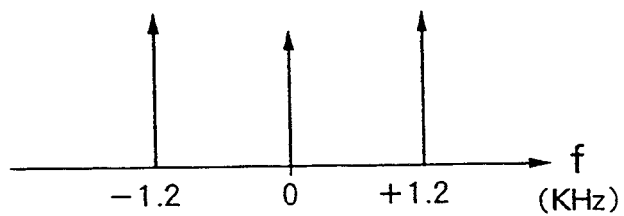
FIG. 7B is a view showing spectrums of a demodulated baseband signal in the alternate pattern signal segment in the V.29 (9,600 bps) modem.

FIG. 5 shows a detection apparatus using condition formula (6) of these formulas.

In the case of condition formulas (7) and (8), the directivity of the adder/subtracter 17 is inverted, and the sign discriminator 19 detects a pseudo random sequence when the signal $S_9$ is negative in each of FIGS. 4 and 5.

Note that the present invention may be applied to either a system consisting of a plurality of devices or an apparatus consisting of a single device.

The present invention may be applied to a case wherein the system or apparatus is realized by supplying a program thereto.

As described above, according to the present invention, an alternate pattern signal can be reliably and precisely detected without causing an erroneous detection even when the level of a reception signal abruptly changes.

Alternatively, a pseudo random sequence can be reliably and precisely detected without causing an erroneous detection even for a reception signal having a low S/N ratio.

What is claimed is:

1. A training detection apparatus for detecting an alternate pattern segment of a training sequence output from a transmission-side modem, comprising:
   first calculation means for calculating a power of a demodulated baseband signal in a received alternate pattern segment;
   second calculation means for calculating a power of a removal signal obtained by removing a frequency component ($\frac{1}{2}$) a baud rate frequency from the baseband signal;
   comparison means for comparing the powers of the signals calculated by said second and first calculation means; and
   detection means for, when a detection state of the alternate pattern continues for a predetermined period, determining on the basis of a comparison result from said comparison means that the alternate pattern segment is detected.

2. The apparatus according to claim 1, wherein said first calculation means calculates the power of the demodulated baseband signal by calculating a square of an absolute value of the demodulated baseband signal.

3. The apparatus according to claim 2, wherein said second calculation means calculates the power of the removal signal by calculating a square of an absolute value of a signal obtained by removing a frequency component ($\frac{1}{2}$) the baud rate frequency by a band elimination filter (BEF).

4. The apparatus according to claim 3, wherein said comparison means compares the powers of the two calculated signals by subtracting the power calculated by said second calculation means from a signal obtained by multiplying the power calculated by said first calculation means with a positive constant $\alpha$ where $0<\alpha<1$ and $\alpha$ satisfies $\{\alpha(\text{power calculated by said first calcula-}$ tion means)}—(power calculated by said second calculation means)} >0 when the alternate pattern segment is detected.

5. The apparatus according to claim 4, wherein when the comparison result from said comparison means is positive, said detection means determines that the alternate pattern segment is detected.

6. The apparatus according to claim 5, wherein said detection means detects whether the comparison result from said comparison means is positive or negative after the comparison result is smoothed.

7. The apparatus according to claim 6, wherein said detection means counts the number of positive smoothed comparison results, and when a count value exceeds a natural number N, said detection means determines that the alternate pattern segment is detected.

8. The apparatus according to claim 1, wherein said first calculation means calculates the power of the demodulated baseband signal by calculating a square of an absolute value of the demodulated baseband signal.

9. The apparatus according to claim 8, wherein said second calculation means calculates the power of the removal signal by calculating a square of an absolute value of a signal obtained by removing a frequency component ($\frac{1}{2}$) the baud rate frequency by a band elimination filter (BEF).

10. The apparatus according to claim 9, wherein said comparison means compares the powers of the two calculated signals by subtracting a signal obtained by multiplying the power calculated by said second calculation means with $\alpha^{-1}$) from the power calculated by said first calculation means, where $\alpha$ is a positive constant determined to satisfy {(power calculated by said first calculation means)$-\alpha^{-1}$(power calculated by said second calculating means)} >0 when the alternate pattern signal is detected.

11. The apparatus according to claim 10, wherein when the comparison result from said comparison means is positive, said detection means determines that the alternate pattern segment is detected.

12. The apparatus according to claim 11, wherein said detection means detects whether the comparison result from said comparison means is positive or negative after the comparison result is smoothed.

13. The apparatus according to claim 12, wherein said detection means counts the number of positive smoothed comparison results, and when a count value exceeds a natural number N, said detection means determines that the alternate pattern segment is detected.

14. A training detection apparatus for detecting a start point of a pseudo random sequence of a training sequence output from a transmission-side modem, comprising:
first calculation means for calculating a smoothed power of a received demodulated baseband signal;
second calculation means for calculating a power of a removal signal obtained by removing a frequency component ($\frac{1}{2}$) a baud rate frequency and a DC component from the baseband signal; and
detection means for comparing the powers of the signals calculated by said second and first calculation means, and detecting the start point of the pseudo random sequence.

15. The apparatus according to claim 14, wherein said second calculation means calculates the power of the removal signal by calculating a square of an absolute value of a signal obtained by removing a frequency component ($\frac{1}{2}$) the baud rate frequency and a DC component by a band elimination filter (BEF).

16. The apparatus according to claim 15, wherein said first calculation means calculates the power of the demodulated baseband signal by calculating a square of an absolute value of the demodulated baseband signal.

17. The apparatus according to claim 16, wherein said first calculation means calculates the power of the demodulated baseband signal by calculating the square of the absolute value of the demodulated baseband signal, and then smoothing the calculation result.

18. The apparatus according to claim 17, wherein said detection means compares the powers of the two calculated signals by subtracting a signal obtained by multiplying the power calculated by said first calculation means with a constant $\gamma$ from the power calculated by said second calculation means, where $\gamma$ has a value that is determined to satisfy {(power calculated by said first calculation means)$-\gamma$(power calculated by said second calculation means)} >0 at the start point of the pseudo random sequence.

19. The apparatus according to claim 18, wherein when the comparison result changes from a negative value to a positive value, said detection means determines that the pseudo random sequence is detected.

20. The apparatus according to claim 14, wherein said first calculation means calculates the power of the demodulated baseband signal by calculating a square of an absolute value of the demodulated baseband signal.

21. The apparatus according to claim 20, wherein said second calculation means calculates the power of the removal signal by calculating a square of an absolute value of a signal obtained by removing a frequency component ($\frac{1}{2}$) the baud rate frequency and a DC component by a band elimination filter (BEF).

22. The apparatus according to claim 21, wherein said detection means compares the powers of the two calculated signals by subtracting the power calculated by said first calculation means from a signal obtained by multiplying the power calculated by said second calculation means with ($\gamma^{-1}$) {where y is a constant}.

23. A training detection method for detecting an alternate pattern segment of a training sequence output from a transmission-side modem, comprising the steps of:
first calculating a power of a demodulated baseband signal in a received alternate pattern segment;
second calculating a power of a removal signal obtained by removing a frequency component ($\frac{1}{2}$) a baud rate frequency from the baseband signal;
comparing the powers of the signals calculated by said second and first calculating step; and
when a detection state of the alternate pattern continues for a predetermined period, determining on the basis of a comparison result from said comparing step that the alternate pattern segment is detected.

24. The method according to claim 23, wherein said first calculating step calculates the power of the demodulated baseband signal by calculating a square of an absolute value of the demodulated baseband signal.

25. The method according to claim 24, wherein said second calculating step calculates the power of the removal signal by calculating a square of an absolute value of a signal obtained by removing a frequency component ($\frac{1}{2}$) the baud rate frequency by a band elimination (BEF).

26. The method according to claim 25, wherein said comparing step compares the powers of the two calculated signals by subtracting the power calculated by said second calculating step from a signal obtained by multiplying the power calculated by said first calculating step with a positive constant $\alpha$ where $0<\alpha<1$ and $\alpha$ satisfies {$\alpha$(power calculated by said first calculating step)}$>0$ when the alternate pattern segment is detected.

27. The method according to claim 26, wherein when the comparison result from said comparing step is positive, said determining step determines that the alternate pattern segment is detected.

28. The method according to claim 27, wherein said determining step determines whether the comparison result from said comparing step is positive or negative after the comparison result is smoothed.

29. The apparatus according to claim 28, wherein said determining step counts the number of positive smoothed comparison results, and when a count value exceeds a natural number N, said determining step determines that the alternate pattern segment is detected.

30. The method according to claim 23, wherein said first calculating step calculates the power of the demodulated baseband signal by calculating a square of an absolute value of the demodulated baseband signal.

31. The method according to claim 30, wherein said second calculating step calculates the power of the removal signal by calculating a square of an absolute value of a signal obtained by removing a frequency component ($\frac{1}{2}$) the baud rate frequency by a band elimination filter (BEF).

32. The method according to claim 31, wherein said comparing step compares the powers of the two calculated signals by subtracting a signal obtained by multiplying the power calculated by said second calculating step with ($\alpha^{-1}$) from the power calculated by said first calculating step, where $\alpha$ is a positive constant determined to satisfy {(power calculated by said first calculating step)$-\alpha^{-1}$(power calculated by said second calculating step)}$>0$ when the alternate pattern signal is detected.

33. The method according to claim 32, wherein when the comparison result from said comparing step is positive, said determining step determines that the alternate pattern segment is detected.

34. The method according to claim 33, wherein said determining step detects whether the comparison result from said comparing step is positive or negative after the comparison result is smoothed.

35. The method according to claim 34, wherein said determining step counts the number of positive smoothed comparison results, and when a count value exceeds a natural number N, said determining step determines that the alternate pattern segment is detected 36. A training detection method for detecting a start point of a pseudo random sequence of a training sequence output from a transmission-side modem, comprising the steps of:

first calculating a smoothed power of a received demodulated baseband signal;

second calculating a power of a removal signal obtained by removing a frequency component ($\frac{1}{2}$) a baud rate frequency and a DC component from the baseband signal; and comparing the powers of the signals calculated by said second and first calculation means, and detecting the start point of the pseudo random sequence.

37. The method according to claim 36, wherein said second calculating step calculates the power of the removal signal by calculating a square of an absolute value of a signal obtained by removing a frequency component ($\frac{1}{2}$) the baud rate frequency and a DC component by a band elimination filter (BEF).

38. The method according to claim 37, wherein said first calculating step calculates the power of the demodulated baseband signal by calculating the square of the absolute value of the demodulated baseband signal.

39. The method according to claim 38, wherein said first calculating step calculates the power of the demodulated baseband signal by calculating the square of the absolute value of the demodulated baseband signal, and then smoothing the calculation result.

40. The method according to claim 39, wherein said comparing step compares the powers of the two calculated signals by subtracting a signal obtained by multiplying the power calculated by said first calculating step with a constant $\gamma$ from the power calculated by said second calculating step, where $\gamma$ has a value that is determined to satisfy {(power calculated by said first calculating step)$-\gamma$(power calculated by said second calculating step)}$>0$ at the start point of the pseudo random sequence.

41. The method according to claim 40, wherein when the comparison result changes from a negative value to a positive value, said comparing step determines that the pseudo random sequence is detected.

42. The method according to claim 36, wherein said first calculating step calculates the power of the demodulated baseband signal by calculating a square of an absolute vale of the demodulated baseband signal.

43. The method according to claim 42, wherein said second calculating step calculates the power of the removal signal by calculating a square of an absolute value of a signal obtained by removing a frequency component ($\frac{1}{2}$) the baud rate frequency component and a DC component by a band elimination filter (BEF).

44. The method according to claim 43, wherein said comparing step compares the powers of the two calculated signals by subtracting the power calculated by said first calculating step from a signal obtained by multiplying the power calculated by said second calculating step with ($\gamma^{-1}$), {where $\gamma$ is a constant}.

* * * * *

UNITED STATES PATENT AND TRADEMARK OFFICE
CERTIFICATE OF CORRECTION

PATENT NO. : 5,337,332

DATED : August 9, 1994

INVENTOR(S) : TATSUYA YAGUCHI, ET AL.

It is certified that error appears in the above-identified patent and that said Letters Patent is hereby corrected as shown below:

COLUMN 8

Line 2, "Power of BEF 14) }0" should read
--Power of BEF 14)}>0--.

Line 5, "Demodulated Signal)}>0" should read
--Demodulated Signal)}<0--.

COLUMN 9

Line 44, "55 $\gamma$(Output Power of LPF 18)-(Power of Signal"
should read --{$\gamma$(Output of Power of LPF 18)-(Power of Signal--.

COLUMN 11

Line 31, "$\alpha^{-1}$)" should read --($\alpha^{-1}$)--.

COLUMN 12

Line 66, "nation" should read --nation filter--.

COLUMN 13

Line 5, "calculating" should read --calculating step)-(power calculated by said second calculating--.

Line 16, "apparatus" should read --method--.

Line 55, "detected" should read --detected.--.

UNITED STATES PATENT AND TRADEMARK OFFICE
CERTIFICATE OF CORRECTION

PATENT NO. : 5,337,332
DATED : August 9, 1994
INVENTOR(S) : TATSUYA YAGUCHI, ET AL.

It is certified that error appears in the above-identified patent and that said Letters Patent is hereby corrected as shown below:

COLUMN 14

Line 44, "vale" should read --value--.

Signed and Sealed this

Thirteenth Day of December, 1994

Attest:

BRUCE LEHMAN

Attesting Officer

Commissioner of Patents and Trademarks